US009291270B2

(12) United States Patent
Notter

(10) Patent No.: US 9,291,270 B2
(45) Date of Patent: Mar. 22, 2016

(54) SEAL AND METHOD OF FORMING THE SEAL

(71) Applicant: David A Notter, Lake in the Hills, IL (US)

(72) Inventor: David A Notter, Lake in the Hills, IL (US)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 14/093,472

(22) Filed: Nov. 30, 2013

(65) Prior Publication Data
US 2015/0152967 A1  Jun. 4, 2015

(51) Int. Cl.
*F16J 15/32* (2006.01)
*B29D 99/00* (2010.01)
*F16J 15/02* (2006.01)
*F16J 15/06* (2006.01)
*B29K 21/00* (2006.01)

(52) U.S. Cl.
CPC ......... *F16J 15/3208* (2013.01); *B29D 99/0053* (2013.01); *B29D 99/0085* (2013.01); *F16J 15/027* (2013.01); *F16J 15/064* (2013.01); *F16J 15/3268* (2013.01); *B29K 2021/003* (2013.01)

(58) Field of Classification Search
CPC ........ F16J 15/32; B29C 35/06; B29C 35/065; B29C 47/0028; B29C 47/003; B29C 47/20
USPC ................... 264/167, 173.17, 174.11, 177.1, 264/177.14, 177.15, 177.16
See application file for complete search history.

(56) References Cited

U.S. PATENT DOCUMENTS

| | | | | |
|---|---|---|---|---|
| 3,578,342 | A | * | 5/1971 | Satterthwaite et al. ........ 277/511 |
| 3,815,637 | A | * | 6/1974 | Carrow ............................ 138/45 |
| 3,834,251 | A | * | 9/1974 | Hawkins ....................... 76/107.6 |
| 4,440,709 | A | * | 4/1984 | Rasmussen ..................... 264/145 |
| 4,554,123 | A | * | 11/1985 | Smyth ............................ 264/166 |
| 4,632,403 | A | * | 12/1986 | Ishitani et al. ................. 277/563 |
| 4,732,723 | A | * | 3/1988 | Madsen et al. ................. 264/147 |
| 5,252,281 | A | * | 10/1993 | Kettner et al. ............ 264/173.17 |
| 5,266,246 | A | * | 11/1993 | Johnson et al. .............. 264/40.1 |
| 5,328,178 | A | * | 7/1994 | Nies .............................. 277/438 |
| 7,066,469 | B2 | * | 6/2006 | Stephens et al. ............... 277/359 |
| 2004/0056385 | A1 | * | 3/2004 | Neter et al. ............... 264/328.14 |
| 2008/0131654 | A1 | * | 6/2008 | Bradford et al. .............. 428/118 |
| 2013/0180179 | A1 | * | 7/2013 | Baratin et al. ................ 49/490.1 |

* cited by examiner

*Primary Examiner* — Kristina Fulton
*Assistant Examiner* — L. Susmitha Koneru
(74) *Attorney, Agent, or Firm* — Inventa Capital PLC

(57) ABSTRACT

A fluid seal of the present invention is disposed between an outer surface, i.e. engine block or any other part that requires application of the assembly and a rotatable member, such as, for example a shaft, wherein the seal circumscribes the shaft and lubricated the shaft and the same rotates around the axis. The seal present a cross section with plurality of channels that allow maximum expose of the seal to a salt bath thereby improving curing process and physical characteristics of the seal. A method of forming such fluid seal is disclosed in the present application.

15 Claims, 4 Drawing Sheets

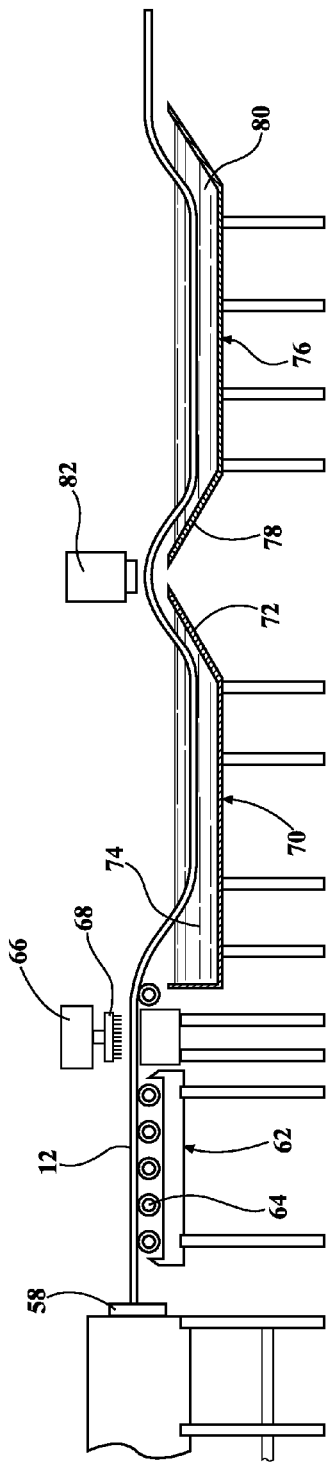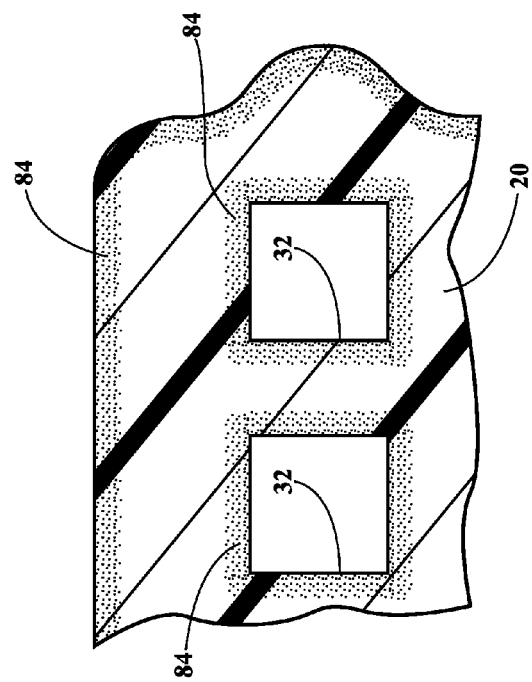

SEAL AND METHOD OF FORMING THE SEAL

FIELD OF THE INVENTION

The present invention relates generally to fabrication of fluid seals for use with relatively rotatable members, such as shafts and the like and curing method for extruded sections of the fluid seals formed of rubber based materials.

BACKGROUND OF THE INVENTION

Fluid seals assemblies of various types are used in numerous applications including and not limited to sealing vehicular engine crankshafts, transmission shafts, bearing lubrication systems, compressor shaft support assemblies, and the like. The fluid seal assembly is designed to retain and seal oil or grease in a predetermined location for lubricating the shaft and to prevent ingress of environmental contaminants.

It is important to properly cure the rubber material before the seal is formed. Art is replete with various rubber curing techniques chosen on the basis of the special characteristics required to obtain and of the composition of the product having to be cured. As known to those skilled in curing art, the curing or vulcanization process consists in heating, at a suitable temperature, a rubber based material so as to form, in its structure, particular molecular bonds apt to confer the required physical/mechanical properties on the finished product. Also as known to those skilled in the curing art, the curing of extruded sections is normally carried out by adopting methods which respond to specific requirements, such as the process must be continuous, following a substantially rectilinear long path, onto which the extruded section settles down as it comes out from the extruder die, the curing of the extruded section should be efficiently obtained both on the surface and in depth.

According to a technique adopted in the past, the extruded section is caused to slide along a set of parallel idle rollers while being heated with hot air. This method however involves various negative aspects and has rapidly fallen out of use. In fact the extruded section, positioned onto the roller carpet still at the plastic state, tends to deform under its own weight even before the start of the curing process apt to confer thereon a proper mechanical strength. Furthermore, in the case of hollow sections (such as tubes), the hot air performs its action perfectly onto the outer surface of the section, but has difficulties in penetrating into the cavity.

In the motor and building industries, it is common practice to extrude sealing sections either from a black thermosetting polymeric material which incorporates one or more fillers to reduce the cost of the extrusion or from a more expensive thermoplastics material. However, in each case, there is often a requirement for the extrusion to have its characteristics changed. For example, in order to stiffen up the polymeric material of a U-sectioned edge trim or door seal, a metallic carrier is incorporated within the extrusion. Hence, there is a requirement for rubber technologists to produce special rubbers which are compatible with and therefore competitive with the harder more expensive thermoplastics materials.

Other prior art disclose a method for caring extruded sections formed of a curable rubber based material, wherein the extruded section is moved forward onto a fluid bed of melted salts, over which it floats. The portion of the extruded section emerging above the melted salts is at least partially enclosed into a compartment, and is heated at a temperature between 20° C. and 800° C. without introducing any liquid substance into said compartment.

Another curing method is disclosed in Great Britain reference No. GB-A-2109042. Here, a rubber extrusion is disclosed wherein a coating of low friction polymer such as PTFE is applied to the surface of the extruded section by means of adhesive or spraying to reduce the frictional resistance of the extrusion. With many surface coatings, which are normally very thin, it is difficult and sometimes impossible to maintain a quality check on the extrusion and it is almost impossible to measure with instruments whether the coating is present or not.

Alluding to the above, U.S. Pat. No. 4,676,856 discloses an extruded door seal which incorporates a thermoplastics polymeric carrier in place of the traditional metal carrier, around which a thermosetting polymer (rubber) is extruded. After extrusion the product is heated to cure the rubber and is then cooled so that the carrier becomes brittle so that it can be fractured along predetermined fracture lines to impart flexibility into the product, whereupon the product is heated in such a way that the carrier becomes soft again so that it can be formed into its required U-shape. Although the door seal disclosed in this specification is primarily formed of rubber, it is expensive to manufacture due to the several stages in the manufacturing process.

In addition to complex and expensive curing methods of the extrusion, there is another problem of a "seal packing" that currently exists in seal manufacturing factories, which this present invention is trying to eliminate. As it was done in the past, it would take several seals of a smaller diameter, when each of the smaller seals would be cut and then reassembled to make, for example, a larger seal with a diameter of ten meters. This process is called "seal packing". Such seal will have at least six or even ten joints, which would result in a possible leak path at any of the joints and replacement of the seal.

The opportunity exist for an improved extruded profile that will be flexible enough in order to allow to form seals of any diameters but with only one joint thereby elimination need for the "seal packing". There is therefore an ongoing requirement for providing a more satisfactory, less expensive product. The inventive concept as set forth further below improves the aforementioned prior art systems and methods.

SUMMARY OF THE INVENTION

A fluid seals assembly (the assembly), generally shown at of the present invention has numerous applications including and not limited to sealing vehicular engine crankshafts, transmission shafts, bearing lubrication systems, compressor shaft support assemblies, and the like. The assembly includes an inventive seal device (the seal) disposed between an outer surface, i.e. a housing or an engine block or any other part that requires application of the assembly and a rotatable member, such as, for example a shaft, wherein the assembly circumscribes the shaft and lubricated the shaft as the same rotates around an axis.

The seal, i.e. a seal sleeve includes a body portion presenting an outer surface that engages a counter surface, i.e. a housing. The body includes a top surface and a bottom surface, a flange extending integrally and radially from the body of the seal, a collar member extending upwardly from the flange to circumscribe the shaft as the seal is disposed between the shaft and the housing. The body includes a plurality of holes or channels defined in the cross section, i.e. the entire circumference of the body and on the top surface of the body. All holes are fluidly communicated with one another.

Alternatively, the holes defined in the top portion may only be in fluid communication with only one row of the holes defined in the body.

A spring retention groove is formed in the collar member to retain a spring thereby applying external pressure to the collar member circumscribing the shaft. The seal sleeve is formed from any suitable elastomeric materials, such as rubber, silicone, polyacrylic, fluoroelastomer, ethylene acrylic, hydrogenated nitrile or nitrile elastomer. The sleeve may also be formed from other materials such as, for example, polytetrafluoroethylene (PTFE) without limiting the scope of the present invention. The seal sleeve is extruded from an extruding apparatus but may be formed by many other suitable methods without limiting the scope of the present invention.

As the extruding apparatus fabricates, i.e. extrudes a seal extrusion, the last is delivered by a conveyor to a hole punching station to forms numerous holes on the top surface. The seal extrusion is then transferred to a salt bath station where the seal extrusion is placed inside the salt bath wherein the salt penetrates though the holes defined in the top surface of the extrusion and in the cross section thereby allowing maximum surfaces, area of the seal extrusion to be exposed, i.e. treated to the salt for maximum salt cure thereby improving cure time and quality of cure. After the cure is complete, the seal extrusion is exposed to a dryer/evaporation station wherein all salt water is evaporated through the holes defined on the top surface of the seal extrusion to remove salt residue from the seal extrusion. The seal extrusion is then rinsed in a clear water station or any other rinsing solution before it is dried and moved to other applications such as seal formation station, and the like.

An advantage of the present invention is to provide a seal fabricated from rubber that includes several holes or channels extending throughout entire cross section of the seal that allows for imposed curing of the seal extrusion as the seal extrusion is placed in a salt bath thereby allowing the salt to penetrate through as many surfaces of the seal extrusion as possible thereby improving curing of the seal extrusion.

Another advantage of the present invention is to provide an improved seal stricture with the plurality of the channels defined therein thereby reducing the overall weight of the seal, save of rubber material, and allowing trimming operations on the seal based on various industrial applications.

Still another advantage of the present invention is to provide am improved seal and method of forming the seal that will reduce the amount of salt bath cure time and allow trimming height and width of the seal and offering a new curing process to confer thereon a proper mechanical strength of the seal to be formed.

Another advantage of the present invention is to form an improved extruded profile of the seal that will be flexible enough to allow to form seals of any diameters but with only one joint thereby elimination need for the "seal packing" and reduce seal leaks.

Other advantages and meritorious features of this invention will be more fully understood from the following description of the preferred embodiment, the appended claims, and the drawings; a brief description of which follows.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 illustrates a side and partial cross sectional view of an assembly line that extrudes the seal extrusion, form the holes on the top portion of the extrusion, and then cures the extrusion in a salt bath and rinses the extrusion after the cure process is complete; and FIG. 6 illustrates a partial cross sectional view of the body of the seal showing at least two of the holes or channels and a side surface of the body and further shows in a dotted lines how different surfaces of the seal, such as the holes and side surface are exposed to the salt for maximum salt cure thereby improving cure time and quality.

DETAILED DESCRIPTION OF THE INVENTION

Figure 1:
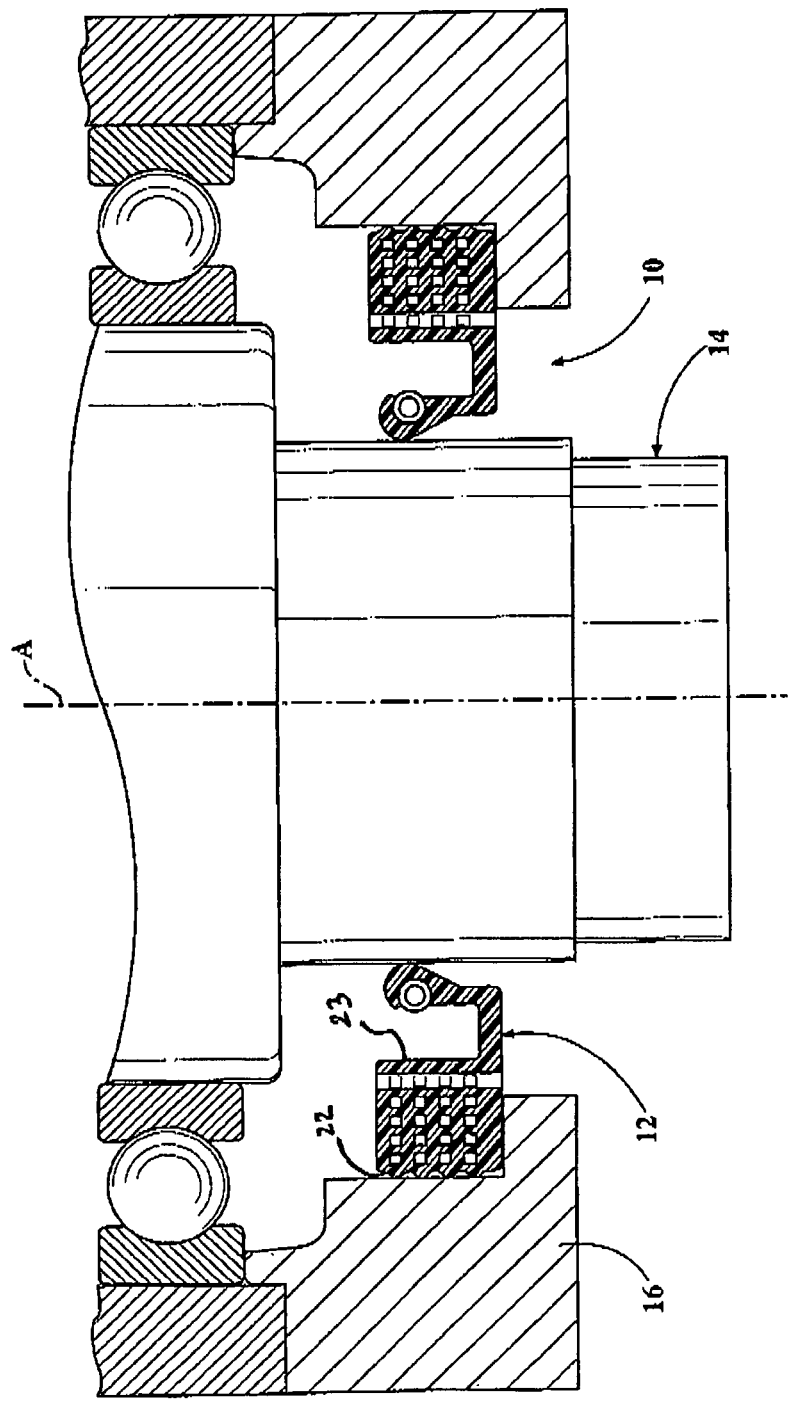
FIG. 1 illustrates a cross sectional view of a seal circumscribing a shaft and disposed between the shaft and a counter surface.

A fluid seals assembly (the assembly), generally shown at 10 of the present invention has numerous applications including and not limited to sealing vehicular engine crankshafts, transmission shafts, bearing lubrication systems, compressor shaft support assemblies, and the like. The assembly 10 includes an inventive seal device (the seal) 12 disposed between an outer surface, i.e. a housing 16 or an engine block or any other part that requires application of the assembly and a rotatable member, such as, for example a shaft 14, wherein the assembly 10 circumscribes the shaft 14 and lubricated the shaft as the same rotates around an axis A.

The seal 12, i.e. a seal sleeve, includes a body portion 20 presenting an outer surface 22 that engages the counter surface, i.e. a housing 16, and an inner surface 23. The outer surface presents a plurality of ribs 24 extending from the outer surface 22 to better engage the housing 16 and prevent relative movement of the seal sleeve with respect to the housing 16. The body portion 20 includes a top surface 28 extending between the outer surface 22 and the inner surface 23 and a bottom surface 26 also extending between the outer surface 22 and the inner surface 23, wherein both surfaces 26 and 28 extend generally perpendicular to an axis A of the shaft 14. The body portion 20 including a plurality of first channels 30 defined on the top portion 28 and extending into a first direction, i.e. parallel to the axis A, and a plurality of second channels 32 defined in the body portion 20 and extending in a second direction different from the first directions with at least some of the first channels 30 being fluidly communicated with the second channels 32 to reduce weigh of the seal device 12, increase flexibility of the seal device 12 and form a plurality of surfaces to be exposed to a salt bath for improved curing before the seal device 12 is formed. The first channels 30 and the second channels 32 may have a circular configuration or a rectangular configuration without limiting the scope of the present invention. The first channels may extend fully throughout entire height of the body portion 20 or partially throughout just several rows of the second channels 32.

Figure 2:
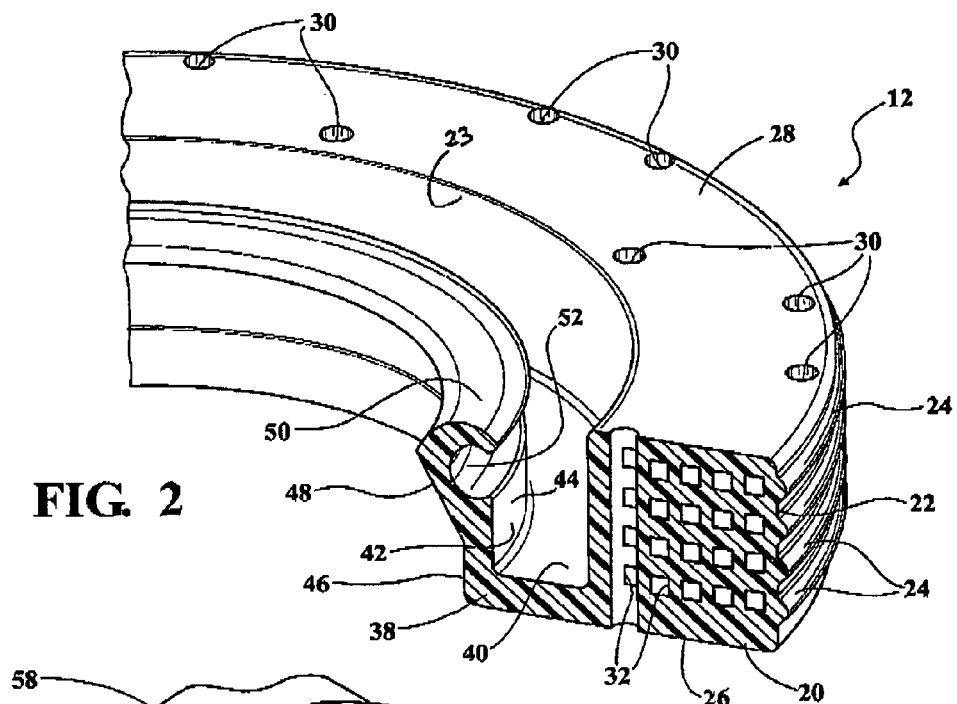
FIG. 2 illustrates a partial cross sectional view of the seal of FIG. 1 that illustrates a plurality of holes or channels formed inside a body of the seal and extending throughout entire circumference of the seal.

As illustrated on FIG. 2, the body portion 20 includes four rows of the second channels with each row presenting four of the individual second channels 32. Number of rows and number of channels in each row is not intended to limit the scope of the present invention and may be less and higher than number of rows and channels shown on FIG. 2. The first channels 30 extend in the first direction from the top surface 28 to the bottom surface 26 wherein the second channels 32 extend in the second direction which extends through along the circumference of the body portion 20 and substantially perpendicular to the first direction.

A flange 38 extends integrally and radially from the body portion 20 of the seal device 12 to form a platform 40 separating the body portion 20 and a collar member 42 extending upwardly from the flange 38 to circumscribe the shaft 14 as the seal device 12 is disposed between the shaft 14 and the housing 16. The collar member 42 includes an active surface 46 and a reverse surface 44, a converging wall 48, and a top edge 50. A spring retention groove 52 is defined in the reverse surface 44 to receive a spring (not shown) thereby applying external pressure to the collar member 42 circumscribing the shaft 14. The seal device 12 is formed from any suitable elastomeric materials, such as rubber, silicone, polyacrylic, fluoroelastomer, ethylene acrylic, hydrogenated nitrile or nitrile elastomer. The sleeve may also be formed from other materials such as, for example, polytetrafluoroethylene (PTFE) without limiting the scope of the present invention. The seal device 12 is extruded from an extruding apparatus 58 having a die plate 59 but may be formed by many other suitable methods without limiting the scope of the present invention.

Figure 4:
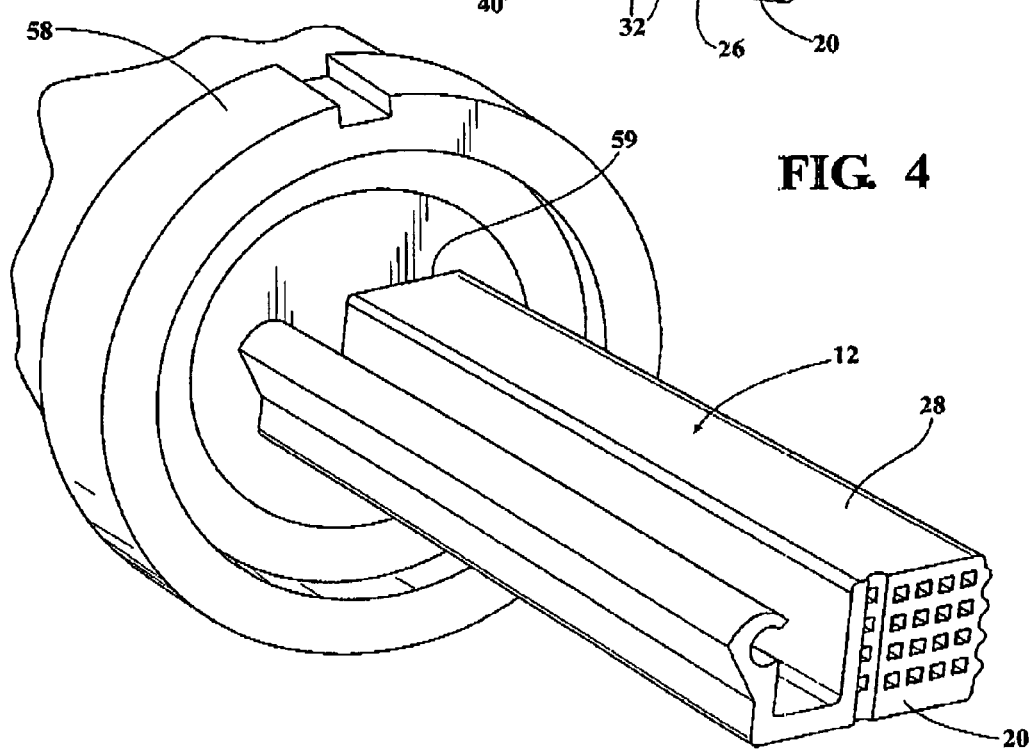
FIG. 4 illustrates a partial cross sectional view of a seal extrusion of FIG. 1 that illustrates a die with an extruder head forming the seal extrusion having the plurality of holes or channels formed inside cross section of the body of the seal extrusion and extending throughout entire length of the seal extrusion.
Figure 3:
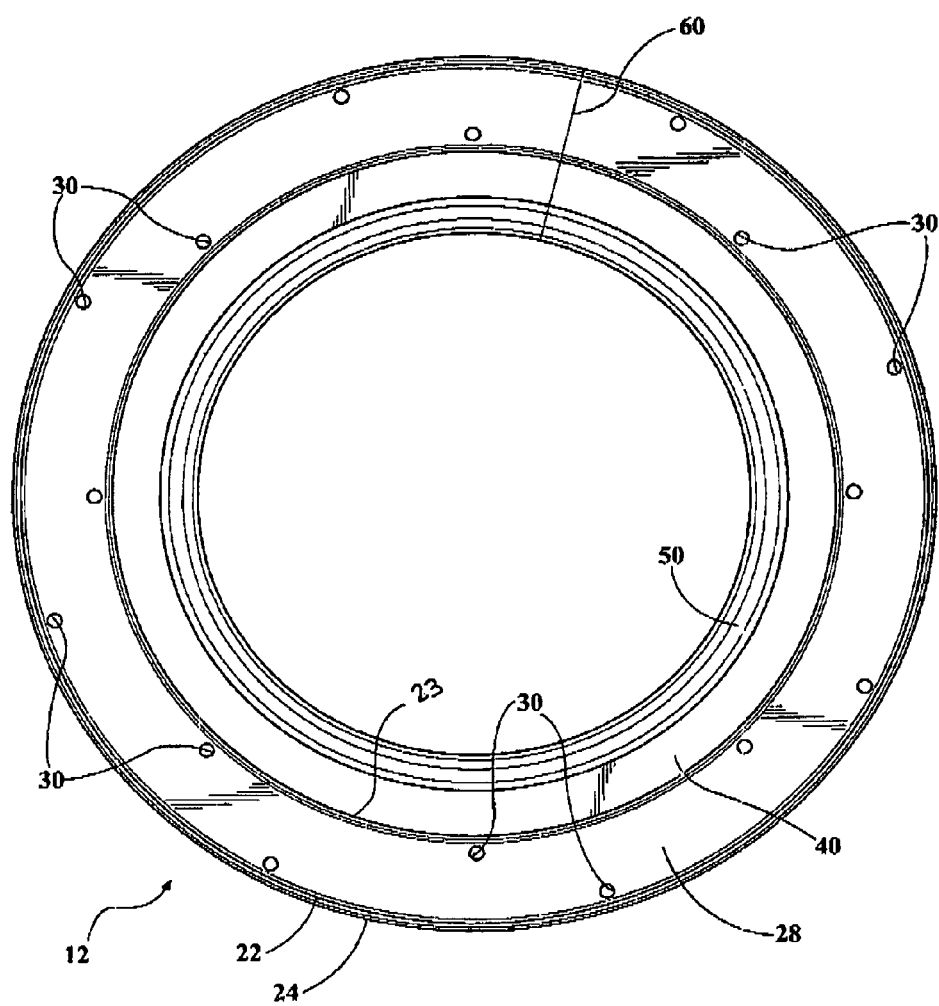
FIG. 3 illustrates a top view of the seal of FIG. 1 that illustrates a plurality of holes formed on a top surface of the seal, which are fluidly communicated at least some of the holes or the channels formed inside the body of the seal.

FIG. 5 shows a process of forming the seal device 12. As rubber or other suitable polymeric material is placed into the extruder apparatus 58 having the die 59, the die is heated to extrude a seal extrusion profile, as shown on FIG. 4, from the die 59 to form the seal extrusion profile having the body portion 20 defining the top surface 28 and the bottom surface 26, the collar member 42 extending from the body portion 20. The seal extrusion profile is also formed with the plurality of the first channels 30 defined on the top portion 28 and extending into the first direction and the plurality of second channels 32 defined in the body portion 20. The seal extrusion profile 12 is transported through a transport station generally indicated at 62 having a conveyor surface 64 to a hole punching station 66 presenting a whole puncher 68 to form the first channels 30 on the top surface.

The seal extrusion profile is then transferred to a curing station, generally indicated at 70. The station 70 has a dish 72 with a melted salt bath 76 to receive the seal extrusion profile 12 to expose all surfaces of the seal extrusion profile 12 to the melted salt, as best shown on FIG. 6, to be exposed to the melted salt, salt fluid bath to improve curing before the seal device 12 is formed. The station 70 presents a continuing curing line where the melted salt and a hot air are used to achieve the curing of the seal extruded profile 12. The temperature of the melted salt can be set from 160 degrees Celsius to 220 degrees Celsius without limiting the scope of the present invention.

The seal extrusion profile 12 is then dried at 82 to remove all residue of the melted salt before the seal extrusion profile 12 is placing in a rinsing station, generally indicated at 76, having a dish 78 containing a rinsing solution 80. This station used re-circulated water to wash away the dried salt from the cured seal extrusion profile 12. The seal extrusion profile 12 is then rinsed in a clear water station or any other rinsing solution 80 before it is dried and moved to other applications such as seal formation station, wherein the seal extrusion profile 12 is cut to a predetermined length in order to form the seal device 12 with only one seam 60.

Applicant conducted numerous tests with a body portion that was solid and did not include the channels 30 and 32. The seal with the solid body portion resulted heavily deformed during the curing, even in its early stages, showed the lip deformation on an extruded profile cured in a static bath of melted salt. Numerous blisters appeared inside the cross-section and on the surface of the extruded profile. Once cured, the extruded profile was heavily deformed and showed presence of the blisters.

An advantage of the present invention is to provide the seal 12 that allows for imposed curing of the seal extrusion as the seal extrusion is placed in the salt bath thereby allowing the melted salt to penetrate through as many surfaces of the seal extrusion 12 as possible thereby improving curing of the seal extrusion 12. Another advantage of the present invention is to provide the seal stricture with the plurality of the channels 30 and 32 defined therein thereby reducing the overall weight of the seal device 12, save of rubber material, and allowing trimming operations on the seal device 12 based on various industrial applications.

Still another advantage of the present invention is to provide the seal device 12 and method of forming the seal device 12 that will reduce the amount of salt bath cure time thereby offering a new curing process to confer thereon a proper mechanical strength of the seal to be formed. Another advantage of the present invention is to form an improved extruded profile 12 as shown on FIG. 4 to provide the seal 12 that will be flexible enough to allow to form seals of any diameters but with only one seam joint 60 thereby elimination need for the "seal packing" and reduce seal leaks.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of forming a seal device to provide a seal between a cylindrical member and a housing with the cylindrical member rotatable around a central axis and relative the housing, said method comprising the steps of:

intaking rubber to an extruder apparatus having a die;

extruding a seal extrusion profile from the die to form the seal extrusion profile having a body portion defining an inner surface and outer surface extending parallel to the central axis, a top surface extending between the inner surface and the outer surface and a bottom surface extending between said inner surface and said outer surface, a collar member extending from the body portion;

placing the seal extrusion profile in a fluid bath to cure the seal extrusion profile before the seal extrusion profile is cut to a predetermined length to form the seal device; and forming a plurality of first channels extending into a first direction through the top surface and the bottom surface and a plurality of second channels defined in the body portion before the seal extrusion profile is placed in the fluid bath as the seal extrusion profile is released from the die with the second channels and extending in a second direction different from the first directions with at least some of the first channels being fluidly communicated with the second channels to reduce weigh of the seal device, increase flexibility of the seal device and form a plurality of surfaces to be exposed to the fluid bath to improve curing before the seal device is formed.

2. A method as set forth in claim 1, including the step of forming the first channels and the second channels with a circular configuration.

3. A method as set forth in claim 2, including the step of forming the first channels and the second channels with a rectangular configuration.

4. A method as set forth in claim 1, including the step of forming at least two rows of the second channels extending throughout entire circumference of the body portion to form hollow areas to reduce weight of the seal device.

5. A method as set forth in claim 1, wherein the first channels are fluidly communicated with the at least two rows of the second channels to remove melted salt contained in the fluid bath.

6. A method as set forth in claim 1, wherein the step of placing the seal extrusion profile in the fluid bath is further defined by placing the extrusion profile in a container with the melted salt.

7. A method as set forth in claim 1, wherein the step of extruding the seal extrusion profile from the die to form the seal extrusion profile is further defined by forming the collar member to defines an active surface and a reverse surface and connection the collar member to the body portion through a flange.

8. A method as set forth in claim 1, wherein the step of extruding the seal extrusion profile to a predetermined length and seaming terminal ends of the seal extrusion profile to form the seal device.

9. A seal device for providing a seal between a cylindrical member and a housing with the cylindrical member rotatable around a central axis and relative the housing, said seal assembly comprising:

a seal member including a body portion engaging the housing, said body portion defining an inner surface and outer surface extending parallel to the central axis a top surface extending between said inner surface and said outer surface and a bottom surface extending between said inner surface and said outer surface;

a collar member extending from said body portion and circumscribing the cylindrical member; and said body portion including a plurality of first channels extending into a first direction through said top surface and said bottom surface and a plurality of second channels defined in said body portion and extending in a second direction different from said first direction with at least some of the first channels being fluidly communicated with said second channels to reduce weigh of said seal device, increase flexibility of said seal device and form a plurality of surfaces to be expose to a salt bath for improved curing before said seal devise is formed.

10. A seal device as set forth in claim 9, wherein said first channels and said second channels present a circular configuration.

11. A seal device as set forth in claim 9, wherein said first channels and said second channels present a rectangular configuration.

12. A seal device as set forth in claim 9, wherein said second channels are formed in at least two rows extending throughout entire circumference of said body portion thereby forming hollow areas to reduce weight of said seal device.

13. A seal device as set forth in claim 9, wherein said first channels are fluidly communicated with said at least two rows of said second channels.

14. A seal device as set forth in claim 9, wherein said collar member defines an active surface and a reverse surface, said collar member connected to said body portion through a flange.

15. A seal device as set forth in claim 14, wherein said collar member presents a neck portion defining a spring retention groove in said reverse surface to receive a spring.

* * * * *